(No Model.)
J. C. WHITE.
COTTON SCRAPER AND CHOPPER.
No. 408,779. Patented Aug. 13, 1889.
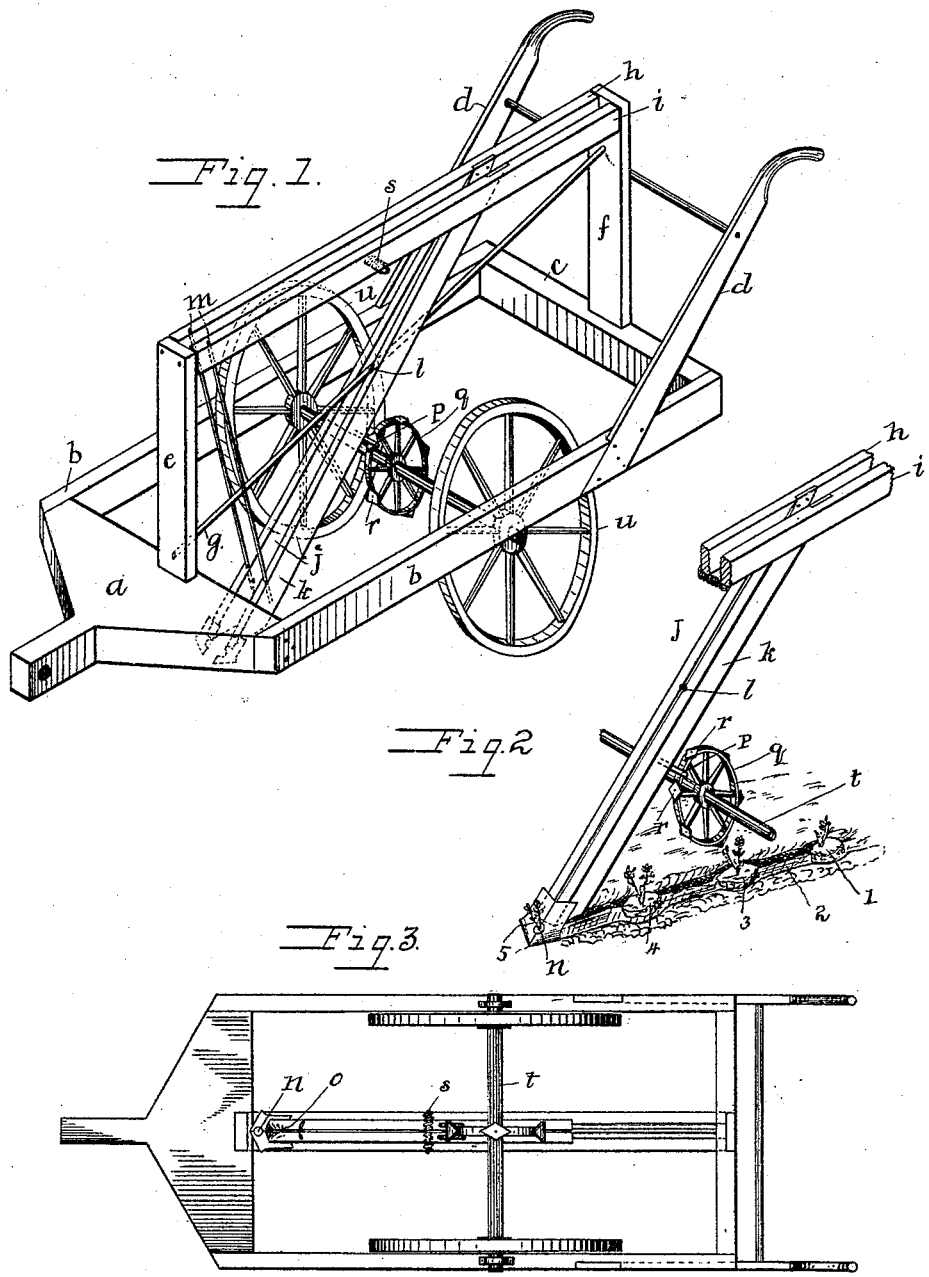
WITNESSES.
R. A. Balderson
M. E. Lansdale
INVENTOR:
J. C. White
John S. Duffie
ATTORNEY.

UNITED STATES PATENT OFFICE.

JOHN CALVIN WHITE, OF MOUNT VERNON, TEXAS.

COTTON SCRAPER AND CHOPPER.

SPECIFICATION forming part of Letters Patent No. 408,779, dated August 13, 1889.

Application filed May 6, 1889. Serial No. 309,719. (No model.)

*To all whom it may concern:*

Be it known that I, JOHN CALVIN WHITE, a citizen of the United States, residing at Mount Vernon, in the county of Franklin and State of Texas, have invented certain new and useful Improvements in Cotton-Scrapers and Cotton-Choppers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has relation to cotton-scrapers and cotton-choppers; and it consists in the novel construction and arrangement of its parts.

In the accompanying drawings, Figure 1 is a perspective view of my invention. Fig. 2 is a detail view. Fig. 3 is a bottom plan view.

My invention is designed to facilitate the cultivation of cotton, and is intended to scrape the grass and surplus cotton from the row, leaving only plants at certain distances apart, to constitute what farmers call a "stand."

My invention consists of an oblong frame composed of a front piece $a$, side beams $b$, and the rear cross-beam $c$, provided with the handles D.

From the center of the front and rear ends of the frame rise front and rear standards $e$ and $f$. Said uprights are braced by a stay-rod $g$, the front end of which is secured to the lower end of the standard $e$ and the rear end is secured to the upper end of the standard $f$. In the upper ends of said standards $e$ and $f$ are longitudinally pivoted two beams $h$ and $i$. To the inner face of said beams are secured two arms $j$ and $k$. The upper ends of the inner faces of said arms are beveled, so that the same may open, and they are each provided with a recess $l$, so that they may come together, notwithstanding the rod $g$, which passes between them, and their front ends are supported by rods $m$, the upper ends of which are secured to the beams $h$ $i$. Said two arms $j$ and $k$ incline forward, and their front ends are provided each with a scraper, and on the inner edge of each is cut out a half-circle, forming, when the two scrapers are closed, a complete circular opening $n$. The lower ends and inner edges $o$ of said beams $j$ and $k$ are beveled away, so that the small cotton may pass between them uninjured as the scrapers close and go forward. These beams $j$ $k$ each have a pin $p$, which rests against the sides of the wheel $q$. To the periphery of the said wheel $q$ are secured at intervals diamond-shaped plates $r$. As said wheel $q$ revolves the diamond-plates come in contact with the pins $p$ and open the scrapers. Thus, for instance, they are opened and close upon the hill of cotton, which I have designated as 1. (See Fig. 2.) They are immediately closed again by the action of the spring $s$ and pass forward, cleaning the row, as indicated by space 2. Then another diamond-plate throws the said scrapers open again, when they almost immediately close and leave the hill of cotton 3, and so on, leaving hills 4 and 5.

It will be seen that the cotton cannot be injured by this process, as it is left to stand in the opening $n$ between the two scrapers; that when they close and move forward the cotton simply draws out of said opening and under the beveled ends $o$ of the said arms uninjured, as it is quite small.

The distance between the hills of cotton may be made greater or smaller by placing the diamond-plates $r$ nearer or farther apart. The said wheel $q$ is rigidly secured on the axle $t$, which in turn is rigidly secured in the hubs of the wheels $u$, upon which wheels the said frame is borne. The rotation of said wheels $u$ revolves the axle and consequently the wheel $q$. The operation is therefore apparent.

Having described my invention, what I claim as new, and desire to secure by Letters Patent, is—

In combination with the oblong frame of the uprights $e$ and $f$, stayed by the bar $g$, beams $h$ and $i$, pivoted longitudinally in the upper ends of said uprights, arms $j$ and $k$, secured to the inner faces of said beams $h$ and $i$, and braces $m$, secured to said beams and said arms, the scrapers secured to the lower ends of said arms, leaving when closed between them the circular opening $n$, pins $p$, working against the edges of the wheel $q$, diamond-plates $r$, secured to the periphery of the said wheel $q$ and operating to open the said arms $o$, spring $s$, operating to close said arms, said wheel $q$ being operated by the axle $t$ and wheels $u$, substantially as shown and described.

In testimony whereof I affix my signature in presence of two witnesses.

JOHN CALVIN WHITE.

Witnesses:
J. B. STRINGER,
HIRAM GLASS.